(12) United States Patent
Leung et al.

(10) Patent No.: US 7,698,179 B2
(45) Date of Patent: Apr. 13, 2010

(54) TRACKING SYSTEM AND LABEL FOR USE IN CONJUNCTION THEREWITH

(76) Inventors: Andy S. Leung, 863 Massachusetts Ave., #26, Cambridge, MA (US) 02139; Ali Ho Clemens, 11 Rumford Rd., Lexington, MA (US) 02420; Sanjay Balu, 20 Pintail Rd., Walpole, MA (US) 02081

( * ) Notice: Subject to any disclaimer, the term of this patent is extended or adjusted under 35 U.S.C. 154(b) by 575 days.

(21) Appl. No.: 11/484,150

(22) Filed: Jun. 27, 2006

(65) Prior Publication Data

US 2007/0156281 A1 Jul. 5, 2007

Related U.S. Application Data

(60) Provisional application No. 60/694,164, filed on Jun. 27, 2005.

(51) Int. Cl.
G06Q 10/00 (2006.01)
(52) U.S. Cl. ............................................. 705/28; 705/1
(58) Field of Classification Search ........................ None
See application file for complete search history.

(56) References Cited

U.S. PATENT DOCUMENTS

| | | | |
|---|---|---|---|
| 5,315,508 A | 5/1994 | Bain et al. | |
| 2002/0038267 A1 | 3/2002 | Can et al. | |
| 2003/0132854 A1 | 7/2003 | Swan et al. | |
| 2003/0158795 A1 * | 8/2003 | Markham et al. | 705/28 |
| 2005/0077354 A1 | 4/2005 | Torchalski | |
| 2005/0182695 A1 * | 8/2005 | Lubow et al. | 705/28 |
| 2005/0230478 A1 | 10/2005 | Chapman et al. | |
| 2005/0251431 A1 | 11/2005 | Schmidtberg | |
| 2005/0252957 A1 | 11/2005 | Howarth et al. | |
| 2005/0289083 A1 | 12/2005 | Ngai et al. | |

FOREIGN PATENT DOCUMENTS

| | | |
|---|---|---|
| EP | 1610263 A | 12/2005 |
| JP | 2005-025722 | 1/2005 |
| WO | PCT/GB2005/000913 | 9/2005 |

* cited by examiner

*Primary Examiner*—F. Zeender
*Assistant Examiner*—Faris Almatrahi
(74) *Attorney, Agent, or Firm*—Kriegsman & Kriegsman

(57) ABSTRACT

A hybrid label is provided with a unique product identification code which can be retrieved using multiple independent processes. In one embodiment, the hybrid label includes an RFID inlay and a printable face sheet which are secured together by a layer of adhesive material. The RFID inlay includes an integrated circuit chip which is programmed with the unique product identification code. The printable face sheet includes a bar code and an alphanumeric character string, each of which is configured to represent the same identification code. A product tracking system designed in accordance with the hybrid label is able to extract the unique identification code from the label and, in turn, associate the identification code with a designated bundle of data records which is located in an external database. The product tracking system can retrieve the identification code through the use of either RFID technology, bar code technology or manual data entry. The ability to monitor an individual article of commerce throughout the retail supply chain provides the system with, among other things, item-level tracking, anti-counterfeit, anti-diversion, security and article return applications.

7 Claims, 8 Drawing Sheets

TRACKING SYSTEM AND LABEL FOR USE IN CONJUNCTION THEREWITH

CROSS-REFERENCE TO RELATED APPLICATIONS

The present application claims the benefit under 35 U.S.C. 119(e) of U.S. provisional Patent Application Ser. No. 60/694,164, filed Jun. 27, 2005, the disclosure of which is incorporated herein by reference.

BACKGROUND OF THE INVENTION

The present invention relates generally to the retail industry and more particularly to the use of radio frequency identification (RFID) technology in the retail industry.

An article of commerce is typically delivered from a supplier (e.g., a brand owner or vendor) to a buyer (e.g., a retailer or brand owner) through a multi-stepped process which is commonly referred to in the art as the retail supply chain. Specifically, referring now to FIG. 1, there is shown a simplified block diagram of one common version of the retail supply chain, the retail supply chain being identified generally by reference numeral 11. In the first step of supply chain 11, a retailer 13 places a purchase order (i.e., an order to purchase product at a specified price) with a supplier 15, the purchase order placement step being represented generally by arrow 17. In response thereto, supplier 15 instructs a manufacturing facility 19 (e.g., a factory) to manufacture product in accordance with the purchase order, the instruction step being identified generally by arrow 21.

In the retail industry, articles of commerce are traditionally provided with one or more identification media (also referred to herein simply as tags, tickets or labels) to communicate pertinent information relating to the articles. For example, an article of clothing is commonly provided with a permanent label which may inform a consumer of, among other things, the name of the manufacturer and/or instructions for washing the article. As another example, an article of clothing is commonly provided with a removable tag which is designed for separation from the article after purchase, the removable tag informing a consumer of, among other things, the price, size and style of the article at the point-of-sale.

Accordingly, it should be noted that, as part of step 21, supplier 15 may additionally instruct manufacturing facility 19 to manufacture any tickets that are to be used in conjunction with the manufactured articles (e.g., shipping labels, price tags, etc.). In the present patent application, references to "manufacturing" and "production" of tags, labels or tickets signify the imprinting and/or encoding of these media, not the fabrication of the media. Some manufacturing facilities possess the equipment and technology to impart different types of data onto each identification tag (i.e., data which can be read using different types of conventional data retrieval technologies). For example, manufacturing facility 19 may impart human-readable printed matter onto a surface of the tag which, in turn, provides a potential customer with relevant details relating to the article (e.g., the size and/or price of the article). As another example, facility 19 may impart information onto each tag which can be automatically retrieved by a computer using an automatic data capture instrument (e.g., a scanner or reader). For instance, a printed bar code system is one well-known and widely used system in which data provided on a tag is automatically captured by a computer using a bar code scanner.

However, as can be appreciated, the production costs associated with the printing, sorting, packing and shipping of individual labels (e.g., labor, equipment and facilities) are often too large for a product manufacturing facility to absorb. As a result, many retail companies often out-source either a portion or all of their ticketing services to a specialist in the ticketing industry. Avery Dennison Corporation of Pasadena, Calif., is widely regarded as an innovator and pioneer in the retail ticketing services industry. TICKET EXPRESS™, which is a well-known retail ticketing service presently commercialized by Avery Dennison Corporation, utilizes a network-based ticketing system to promote efficient and accurate ticket production and management services.

Accordingly, if manufacturing facility 19 is not suitably equipped to meet the ticketing demands of the purchase order, the ticketing services may be alternatively directed to a ticketing service bureau 23 that specializes in retail ticketing services (e.g., Avery Dennison Corporation's TICKET EXPRESS™ retail ticketing service bureau), this directing step being represented generally by arrow 25 in FIG. 1. Having received the ticketing requests for the purchase order, ticketing service bureau 23 generates all the necessary tickets and forwards the tickets to manufacturing facility 19, as represented generally by arrow 27.

Once the product and all of its corresponding tickets have been manufactured, manufacturing facility 19 affixes the tickets to the product. At this time, manufacturing facility 19 commences its product packing process. It should be noted that various types of traditional packing hierarchies are commonly used in the retail industry. As one example, individual items which are tagged in conjunction with the purchase order are often packed within a carton which is, in turn, provided with an identification label. A plurality of the cartons may then be packed within a pallet, the pallet being provided with a shipping label to facilitate accurate transport. As can be appreciated, numerous varieties of packing hierarchies are commonly employed in the retail industry. However, for purposes of simplicity, the present invention will be described in conjunction with the aforementioned items-cartons-pallet packing hierarchy. Nonetheless, it is to be understood that the present invention is not limited to the aforementioned packing hierarchy but rather could be used with alternative types of conventional packing hierarchies (e.g., an items-prepacks-cartons-pallets-shipping container packing hierarchy) without departing from the spirit of the present invention. It is also to be understood that use of the term "product" as defined herein relates to any object to which a label may be secured, such as an item, carton, pallet, etc.

The packed and labeled pallet is then transferred from manufacturing facility 19 to a freight consolidator 29 for shipment, this transfer step being identified generally by arrow 31. In compliance with the purchase order, consolidator 29 then ships the pallet to a specified retailer distribution center 33 (e.g., a retailer warehouse) in the most efficient and economically advantageous manner, as represented generally by arrow 35 in FIG. 1. If necessary, the pallet is opened at distribution center 33 and the particular product requested in the original purchase order is delivered from distribution center 33 to retailer 13 (e.g., as part of a smaller package), the delivery step being identified generally by reference numeral 37. Once received at retailer 13, the product is then displayed for sale.

For many years, the retail industry has relied on automatic identification (auto ID) technologies to facilitate product tracking at various stages throughout the supply chain. For instance, by periodically capturing a unique identification code that is provided on a traditional shipping label, a retailing management system is able to effectively track the product to which the label is affixed throughout the supply chain.

As will be described further in detail below, the ability to track a product throughout the supply chain provides a number of significant advantages (e.g., improved efficiency and greater visibility).

Bar code systems are commonly used to track the location of a product throughout the supply chain. Simply stated, a bar code is a stamp-sized patch of parallel lines that may vary both in their individual thickness and in the spacing between successive lines. Using a bar code reader, which includes the combination of an infrared or light emitter and an optical detector, the pattern of lines in a bar code can be captured by a computer which translates said pattern into a numeric code that, in turn, can be used to store and/or retrieve data relating to the product to which the label is affixed.

It has been found that most types of bar codes are capable of storing a relatively small amount of data. As a result, bar code systems have been traditionally used in the art to identify only the manufacturer, product and version of a particular item. To the contrary, bar code systems are not typically used to uniquely identify individual articles of commerce from similar articles of commerce (i.e., item-level identification). For example, bar coding may be used to identify an article as a 12 ounce can of a particular soft drink. Bar coding is not typically used to uniquely identify (i.e., distinguish) one 12 ounce can of soda from an identical 12 ounce can of soda. Because bar code systems are not designed for item-level identification, most commercially available supply chain management systems which utilize automated bar code systems have been limited to product tracking at either the carton-level or the pallet-level.

As can be appreciated, the retail industry has recently recognized that a number of considerable benefits arise from being able to uniquely identify individual articles of commerce for tracking purposes. As a result, the retail industry is currently exploring the use of supplemental means of automatic identification (other than traditional bar codes) in conjunction with supply chain management systems to accommodate product tracking at the item level.

The electronic product code (EPC) is a well-known identification coding system which has recently grown into prominence in the retail ticketing industry. The electronic product code is particularly useful in that it is capable of providing a relatively large number of unique identification codes for articles of commerce. In fact, a 96 bit electronic product code system provides unique identification codes for 268 million companies, wherein each company is able, in turn, to assign 16 million object classes and 68 billion serial numbers in each class. As can be appreciated, the implementation of a 96 bit electronic product code system in the retail industry would adequately cover all products manufactured worldwide in the present and in the immediate future.

One means for implementing the electronic product code is through the use of radio frequency identification (RFID) technology. In particular, many companies in the retail and retail ticketing industries have supplemented and in some cases replaced the use of traditional bar codes with radio frequency identification (RFID) tags, each RFID tag designed to be secured to an individual article of commerce (as well as the cartons, pallets and shipping containers which house the individual articles). When used to label an individual item, each RFID tag is assigned a unique EPC-based identification code (e.g., an EPCglobal-based code) to provide retailers with a means for uniquely identifying each item in the supply chain, as will be described further below.

RFID devices are most commonly categorized as labels or tags. Some examples of RFID tags and labels appear in U.S. Pat. Nos. 6,107,920 and 6,206,292. RFID labels are often considered to be RFID devices that are adhesive or otherwise have a surface that is attached directly to objects. RFID tags, in contrast, are secured to objects by other means, for example by use of a plastic fastener, string or other fastening means. RFID tags, labels or other marking media used in the garment and accessories retail industry can include, for example, pressure sensitive adhesive labels, heat transfer labels, printed fabric labels, woven labels, graphic hang tags, price tickets, loop tags, and pocket flashers. Identification media are referred to herein somewhat interchangeably as "labels", "tags" or "tickets"; as used in the specification and claims, the terms "label" and "RFID label" may indicate any type of marking or identification media, and do not necessarily require that the media be directly attached to objects.

RFID devices include active tags and labels, which include a power source, and passive tags and labels, which do not. In the case of passive tags, in order to retrieve the information from the chip, a "base station" or "reader" sends an excitation signal to the RFID tag or label. The excitation signal energizes the tag or label, and the RFID circuitry transmits the stored information back to the reader. The "reader" receives and decodes the information from the RFID tag.

RFID technology provides a number of advantages over bar codes as noted above, such as increased data storage capacity and the ability to read and RFID device without requiring line of sight access to the device. On the other hand, manufacturing facilities that install RFID labeling systems must invest in potentially expensive RFID equipment and infrastructure such as printers and scanners, and some factories may choose to delay that investment. Also, as compared to bar codes which are relatively durable, RFID devices are vulnerable to damage causing corruption or loss of data. The present invention addresses these challenges in adopting and using advanced automatic identification technologies, such as RFID in combination with bar code technologies, in retail supply chain management systems.

In the retail industry, there presently exist retail supply chain management systems which are designed, among other things, to facilitate the exchange of order information amongst the various participants of a closed-loop, global supply chain. Avery Dennison Corporation of Pasadena, Calif. (hereinafter referred to simply as Avery) is widely regarded as an innovator and pioneer in the retail supply chain management systems industry. An example of one of Avery's proprietary business models for providing retail supply chain management systems is presently commercialized under the name of InfoChain Express™. InfoChain Express™ is a secure, web-based supply chain information management solution that allows all partners in the traditional retail supply chain to readily access pertinent order information (e.g., purchase order data, shipment receipts and acknowledgments, delivery schedules, advanced shipping notifications, ticket formats, etc.) in an accurate and reliable manner.

Referring now to FIG. 2, there is shown a simplified block diagram of the InfoChain Express™ business model as it relates to the participants of retail supply chain 11, the business model being identified generally by reference numeral 38. As is readily apparent, a retail supply chain management system 39 (i.e., Avery) serves as a communication hub between the various participants of retail supply chain 11, system 39 being preferably connected to each of the participants through an internet-based, electronic communication path 41. System 39 preferably comprises a server 45 which is linked to an external database 47 (e.g., through a local area network (LAN). Although represented herein conceptually as a single database, it is to be understood that database 47 may include a plurality of linked databases.

Retail supply chain management system 39 serves to facilitate the exchange of order information between the participants of retail supply chain 11 in the following manner. Specifically, in the first step, a purchase order (i.e., an order for a retailer to purchase product from a supplier at a specified price) is electronically transmitted from supplier 15 to supply chain management system 39, this transmission step being represented generally by arrow 49 in FIG. 2. Once received by management system 39, the purchase order is stored in database 47, as represented generally by arrow 51. Preferably, the purchase order is retrievable utilizing user-friendly, highly intuitive, graphical user interface (GUI) screen displays to render the particulars of the purchase order readily apparent.

It should be noted that, as a precursor to transmission step 49, the terms and conditions of the purchase order established between retailer 13 and supplier 15 may be negotiated electronically via management system 39. In this scenario, retailer 13 electronically transmits an initial merchandise order to management system 39 in any format. In turn, server 45 translates the order and stores the order information as data records within database 47. Supplier 15 then logs into management system 39 and accesses the initial purchase order from database 47. For security purposes, supplier 15 is verified as an authorized user by means of a web-based authentication system (e.g., a standard log-in process). Having reviewed the order, supplier 15 in turn accepts or rejects the terms and conditions of the order, the response being stored in database 47 with the original order information. Retailer 13 then retrieves the response from database 47 and, if necessary, changes the terms and/or conditions of the original order until the order is accepted by both retailer 13 and supplier 15.

Upon completion of storage step 51, supply chain management system 39 releases the purchase order from database 47 to manufacturing facility 19, said release step being represented generally by arrow 53 in FIG. 2. Preferably, manufacturing facility 19 is provided with sophisticated software (supplied as part of the services provided by management system 39) that is designed to receive the purchase order and translate said order into a client-based format which can be used, in turn, to manage the process in which the product is packed for shipment, as will be described further in detail below. Once the purchase order is received and translated, manufacturing facility 19 begins its manufacturing process in accordance therewith.

In conjunction with release step 53, management system 39 additionally releases the purchase order to manufacturing facility 19 so that the production of tickets to be used in conjunction with the product (e.g., shipping labels, price tags, etc.) can commence. If manufacturing facility 19 is not suitably equipped to meet the ticketing demands, management system 39 extracts data from the purchase order and generates a corresponding ticket order which, in turn, is directed (i.e., out-sourced) to ticketing service bureau 23 (e.g., Avery's TICKET EXPRESS™ retail ticketing service), as represented generally by arrow 55 in FIG. 2. Ticketing service bureau 23, having received the ticket order from management system 39, in turn produces all the necessary tickets and ships the tickets to manufacturing facility 19, as represented generally by arrow 57 in FIG. 2.

Having received the tickets from ticketing service bureau 23, manufacturing facility 19 affixes the tickets to the manufactured product. At this time, manufacturing facility 19 commences its product packing process. In compliance with the instructions provided in the client-based purchase order, manufacturing facility 19 packs tagged articles into a particular carton. During the packing process, a scanner (e.g., a hand-held bar code scanner) that is connected to the computer system at manufacturing facility 19 is used to automatically capture the identification data associated with each tagged article. In addition, the scanner is used to automatically capture the identification data associated with the shipping label present on the carton into which the items are disposed. In this manner, the sophisticated software provided on the computer system at manufacturing facility 19 is capable of generating an advanced shipping notification (ASN) which links together the carton and the types of items contained therein with respect to the original purchase order. It should be noted that the above-described means for electronically capturing packing information is not limited to items packed within a carton. Rather, it is to be understood that the above-described means could be implemented in conjunction with any well-known packing hierarchy (e.g., packing multiple cartons within a pallet, packing multiple pallets within a shipping container, etc.) without departing from the spirit of the present invention.

With an advanced shipping notification having been created, manufacturing facility 19 electronically transmits the ASN information to management system 39, the ASN transmission step being identified generally by arrow 59. Server 45 translates the ASN data into an appropriate format (e.g., a user-friendly format) and uploads the data in database 47 in association with original purchase order, the uploading step being represented generally by arrow 61 in FIG. 2. Simultaneously, management system 39 releases the translated ASN information to designated recipients in the supply chain. For example, management system 39 may release the translated ASN information to supplier 15, retailer 13, distribution center 33 and consolidator 29, as represented generally by arrows 63, 65, 67 and 69, respectively.

The product is then delivered by manufacturing facility 19 to consolidator 29 for shipment, as represented generally by arrow 71 in FIG. 2. In compliance with the ASN, consolidator 29 ships the product to the specified retail distribution center (DC) 33 in the most efficient and economically advantageous manner, the shipping step being represented generally by arrow 72 in FIG. 2.

It should be noted that the product is preferably scanned at various stages during the shipping process, the scanned information being uploaded into centralized database 47 to provide interested parties with readily accessible and up-to-date shipment tracking information. In this manner, it is to be understood that retailer 13 may periodically track the real-time status of the pending purchase order, which is highly desirable.

In conjunction with the ASN, distribution center 33 transports the product (or a portion thereof) to retailer 13, as represented generally by arrow 73 in FIG. 2, which thereby denotes completion of the execution of the original purchase order. At this time, interested parties can review the details of the executed purchase order (from database 47) for reasons to be described in detail below (e.g., manufacturing facility efficiency, anti-divergence protection, etc.)

It is readily apparent that the above-described retail supply chain management business model 38 introduces a number of significant advantages over retail supply chain 11.

As a first advantage, the above-described business model improves the overall accuracy in which the purchase order is executed. Specifically, the business model incorporates the use of automated data capture means (e.g., bar coding) at various stages in the supply chain in order to minimize the risk of human data entry errors. Furthermore, the use of automated data capture means provides, among other things, streamlined, real-time reporting of purchase order status (as well as any purchase order modifications), verification that the product is packed properly, workload reduction for consolidator 29, improved efficiency at taking inventory at distribution center 33 and reduction in customs delays that can result in lost sales.

As a second advantage, the above-described business model establishes a direct communication link between all of the participants in the supply chain, thereby increasing the visibility of crucial order information. Because the order information is provided in an web-retrievable format, a compliance standardization is created. In other words, the nature of the system allows for all participants with internet accessibility to easily retrieve pertinent order information via widely accessible systems that do not require software downloads. By providing all of the participants with the ability to retrieve any/all pertinent data, the efficiency and overall success of the supply chain is maximized. This, in turn, enables retailer 13 to more adequately anticipate receipt of the order, thereby allowing for greater customer demand to be met in a timely manner.

As a third advantage, the above-described business model is highly reliable in nature. Specifically, management system 39 can be used to protect against unscrupulous activity, such as product tampering, product diversion and product counterfeiting, as will be described further in detail below. Furthermore, routine security updates can made to the data management software at system 39 without burdening any of the other supply chain participants.

Referring now to FIG. 3, there is shown an exploded, top perspective view of an RFID tag that is currently offered for sale by Avery Dennison Corporation of Pasadena, Calif., said RFID tag being identified generally by reference numeral 75. RFID tag 75 comprises an RFID inlay 77 that is secured to the underside of a printable face sheet (or facestock) 79 by means of a first layer of pressure sensitive adhesive 81. The underside of RFID inlay 77 is in turn releasably secured to a liner sheet 83 by means of a second layer of pressure sensitive adhesive 85 so as to form a unitary RFID tag assembly, said RFID tag assembly being identified generally by reference numeral 87.

As seen most clearly in FIG. 4, RFID inlay 77 includes a substrate 89, an antenna 91 disposed on one surface of substrate 89 and an RFID integrated circuit (IC) chip 93 coupled to antenna 91. As will be described further below, IC chip 93 is designed to generate a radio frequency signal which is in turn propagated by antenna 91.

Integrated circuit chips which are used in RFID applications are typically categorized by class. A class 0 integrated circuit chip is defined as having a memory capacity of 64 or 96 bits (this memory capacity being commonly referred to in the art as "user-defined" memory) and read only capabilities (i.e., preprogrammed with data that can be read multiple times but that can not be reprogrammed). A class 1 integrated circuit chip is defined as having a memory capacity of 64 or 96 bits and limited read/write capabilities (i.e., data can be written into said chip once but read multiple times). A class 2 integrated circuit chip is defined as having a memory capacity of 96 to 256 bits (i.e., a greater maximum memory capacity than both the class 0 and the class 1 IC chips) and unlimited read/write capabilities (i.e., can be read and reprogrammed multiple times).

For purposes of simplicity only, IC chip 93 is defined herein as being a class 1 integrated circuit chip which can be programmed a single time to include an automatic identification code. However, it is to be understood that IC chip 93 could be replaced with any other IC chip which is well-known in the art without departing from the spirit of the present invention.

Facestock 79 is preferably constructed using a print-receptive material, such as paper. During the construction of tag 75, printed matter is preferably provided onto the front surface of facestock 79 in order to communicate information relating to the product to which RFID label 75 is secured.

Liner sheet 83 includes a backing 95 and a release coating 97 applied to the top surface of backing 95. Liner sheet 83 may serve as a common web on which a plurality of RFID labels 75 are retained, with adjacent labels 75 being spaced apart from one another by a distance of approximately ⅛ to ¼ inch. In this manner, a continuous supply of label assemblies 87 can be formed into a roll which can be then be used in an assembly line environment.

Backing 95 is preferably a length of polyethylene terephthalate film, a length of Mylar® polyester film, or a strip of paper. Release coating 97 is typically a silicone or wax release from which label 75 can be manually removed, thereby exposing adhesive layer 85 of RFID label 75. Having been removed from release coating 97, RFID label 75 can be disposed against a desired article with adhesive layer 85 directly contacting the article so as to secure RFID label 75 thereto.

RFID label 75 can be used in the retail industry to wirelessly transmit data associated with a particular article to a computer system (e.g., for the purpose of taking inventory). As can be appreciated, the use of radio frequency identification technology in the retail industry has been found to introduce a number of notable advantages.

As a first advantage, the use of RFID technology allows for a large quantity of data to be exchanged within a relatively short period of time. As noted above, RFID technology supports the electronic product code which in turn can be used to assign each individual article of commerce in the world today a unique identification code. The unique identification code can in turn be used as a means for retrieving data records relating to said article from an external database.

As a second advantage, due to the simplicity and cost-effective manner in which information can be readily extracted from an integrated circuit chip, data can be extracted from an RFID label at a greater number of locations and/or with greater frequency during the supply chain. As a result, RFID technology affords a client with the capability to more adequately monitor inventory (with updates generated in real-time). Greater monitoring of inventory affords the client with greater product control (security), an increased efficiency in supplying/stocking retailer 13 with the proper amount of product (i.e., greater efficiency in managing safety-stock inventory) and a greater ability to locate a product (e.g., within a large warehouse).

As a third advantage, the use of RFID technology eliminates the need for a direct line of sight during the automatic exchange of data (which is presently required in bar code systems). In fact, because many conventional RFID systems operate in a range of several meters, there is often little need for the handling of individual articles during the data exchange process. Because human involvement is minimized during the data exchange process, the risk of human error introducing data inaccuracies can be significantly reduced.

As a fourth advantage, RFID technology is effective in visually and environmentally challenging conditions. For example, because the RFID inlay is sealed within the tag, the IC chip is adequately protected from harsh outside elements. To the contrary, traditional bar codes are directly exposed to outside elements which can compromise their integrity and, as a consequence, their functionality.

As a fifth advantage, because RFID technology allows for the extraction of data automatically, labor costs typically associated with the exchange of data in the retail industry can be minimized.

Further advantages associated with the use of RFID technology in retail environments are described in U.S. Patent Application Publication No. 2002/0038267 to N. Can et al., and U.S. Patent Application Publication No. 2003/0132854 to R. J. Swan et al., both of said publications being incorporated herein by reference.

Despite all of the advantages associated with RFID technology that were described in detail above, applicant has discovered a number of less obvious drawbacks associated with the use of RFID technology in the retail industry.

As a first drawback, participants in the retail supply chain often lack the significant capital that is required to purchase RFID equipment (e.g. RFID readers). Without the necessary RFID equipment, these participants are unable to extract the unique identification code that is assigned to an RFID label.

As a second drawback, in the event that RFID chip 91 should malfunction (e.g., fail to operate as the result of either intentional or unintentional chip damage), participants in the retail supply chain are precluded from retrieving the data stored on the RFID label.

As a third drawback, in the event that RFID chip 91 has been tampered with (e.g., by an unscrupulous customer seeking to circumvent the security applications of RFID technology), participants in the retail supply chain are precluded from retrieving the data stored on the RFID label. Stated another way, RFID technology does not presently afford a means for verifying the authenticity of data provided by an RFID label.

As can be appreciated, the inability for participants in the supply chain to retrieve the data stored on an RFID label detrimentally affects the supply chain in two ways. First, participants in the supply chain are unable to retrieve (i.e., download) crucial product information from a central database (e.g., retrieve real-time tracking information). Second, participants in the supply chain are unable to supply (i.e., upload) pertinent product information to a central database (e.g., provide data that is used to update the real-time tracking information).

SUMMARY OF THE INVENTION

It is an object of the present invention to provide a new and improved system for tracking a product within the retail supply chain.

It is another object of the present invention to provide a product label for use in conjunction with the tracking system as described above.

It is yet another object of the present invention to provide a product label as described above which is designed to include a unique identification code.

It is still another object of the present invention to provide a product label as described above which includes a unique identification code that can be retrieved using radio frequency identification (RFID) technology.

It is yet still another object of the present invention to provide a product label as described above which includes a link code that allows for retrieval of the unique identification code by means other than RFID technology.

Accordingly, as one feature of the present invention, there is disclosed system for tracking at least one product, such as an item, carton or pallet, within a retail supply chain, the system comprising (a) a supply chain management system which includes at least one database, the at least one database having a first set of electronic data records stored therein, the first set of electronic data records being designated for a first product, (b) a label affixed to the first product, the label comprising, (i) an radio frequency identification (RFID) device that stores a unique product identification code, (ii) a printed barcode configured to represent a link code that is different from the unique product identification code, and (iii) an alphanumeric character string configured to represent the link code, (c) a computer configured to capture the unique product identification code and the link code from the label, the computer being connected to the supply chain management system through a communication path, (d) automated means for capturing the unique product identification code on the computer from the RFID device, (e) automated means for capturing the link code on the computer from the barcode provided on the label, and (f) means for capturing the link code on the computer from the alphanumeric character string provided on the label, (g) wherein the supply chain management system utilizes the unique product identification code to identify the first set of electronic data records stored in the database, (h) wherein the supply chain management system utilizes the link code to locate the unique product identification code which is in turn utilized to identify the first set of electronic data records stored in the at least one database.

As another feature of the present invention, there is disclosed system for tracking at least one product, such as an item, carton or pallet, within a retail supply chain, the system comprising (a) a supply chain management system which includes at least one database, the at least one database having a first set of electronic data records stored therein, the first set of electronic data records being designated for a first product, (b) a label affixed to the first product, the label being provided with a unique product identification code, the label comprising, (i) an RFID device that stores the unique product identification code, (ii) a printed barcode configured to represent the unique product identification code, and (iii) an alphanumeric character string configured to represent the unique product identification code, and (c) a computer configured to capture the unique product identification code from the label, the computer being connected to the supply chain management system through a communication path, (d) wherein the supply chain management system utilizes the unique product identification code to identify the first set of electronic data records stored in the at least one database.

As another feature of the present invention, there is disclosed a system for tracking at least one product, such as an item, carton or pallet, within a retail supply chain, the system comprising (a) a supply chain management system which includes at least one database, the at least one database having a first set of electronic data records stored therein, the first set of electronic data records being designated for a first product, (b) a label affixed to the first product, the label comprising an RFID device that is provided with an identification code, and (c) a computer configured to capture the identification code from the RFID device using radio frequency identification technology, the computer being connected to the supply chain management system through a communication path, (d) wherein the supply chain management system utilizes the identification code to identify the first set of electronic data records stored in the at least one database.

Various other features and advantages will appear from the description to follow. In the description, reference is made to the accompanying drawings which form a part thereof, and in which is shown by way of illustration, various embodiments for practicing the invention. The embodiments will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings wherein like reference numerals represent like parts.

DETAILED DESCRIPTION OF THE PREFERRED EMBODIMENT

Figure 1:
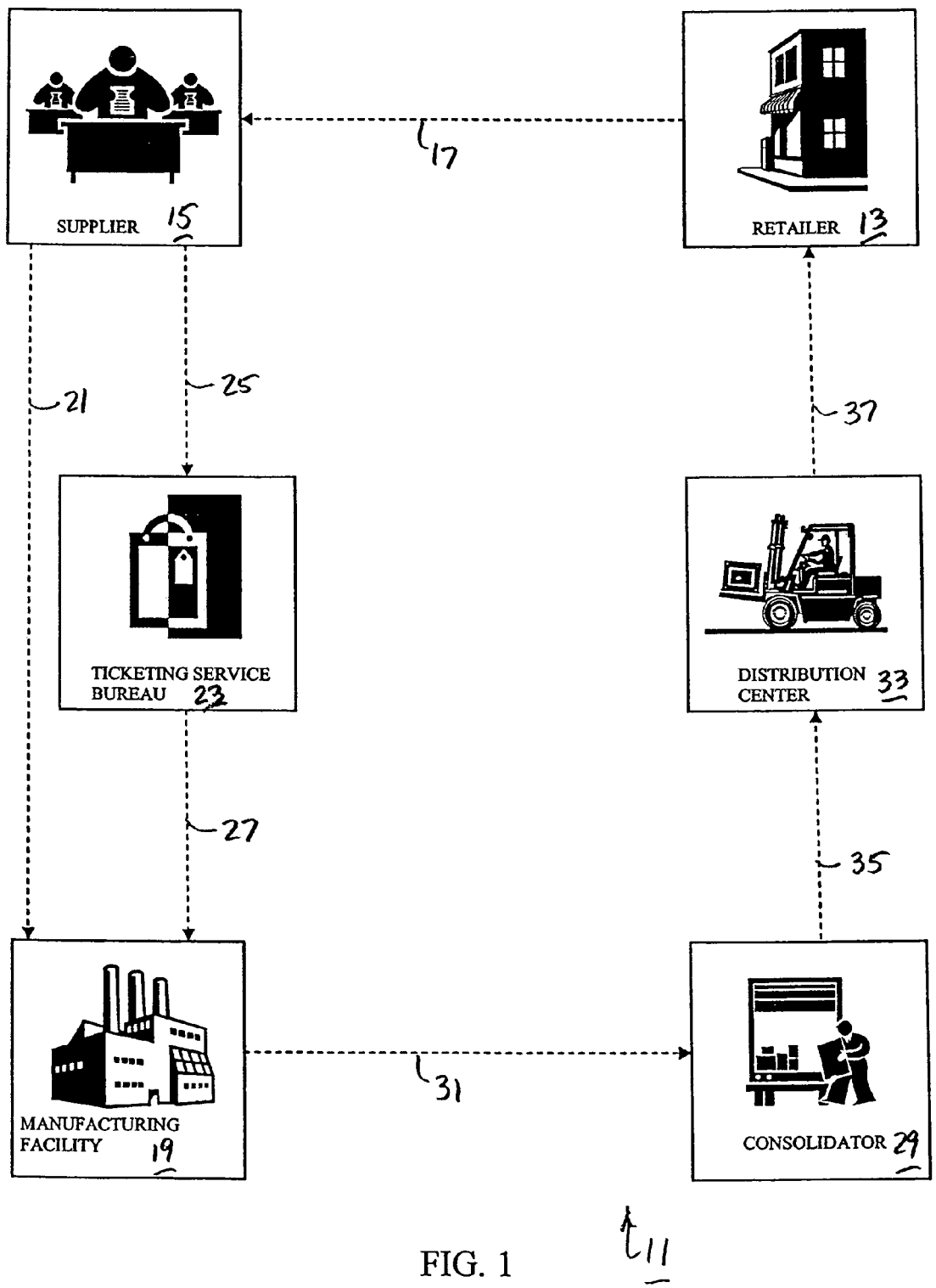
FIG. 1 is a simplified block diagram of a traditional version of the retail supply chain.
Figure 2:
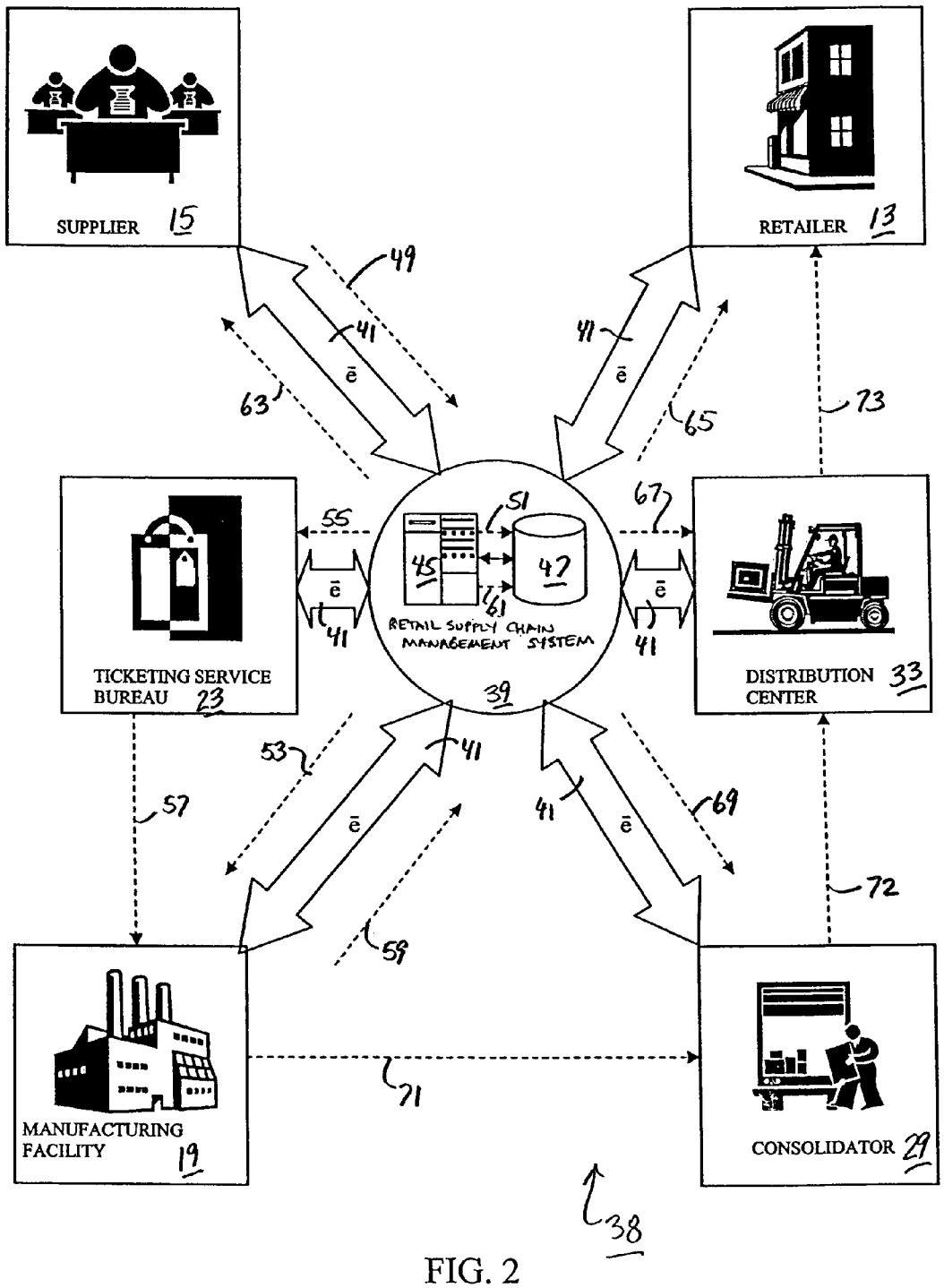
FIG. 2 is a simplified block diagram of a proprietary business model for facilitating the exchange of information between the participants of the traditional retail supply chain shown in FIG. 1, said diagram being useful in understanding features of the present invention.
Figure 4:
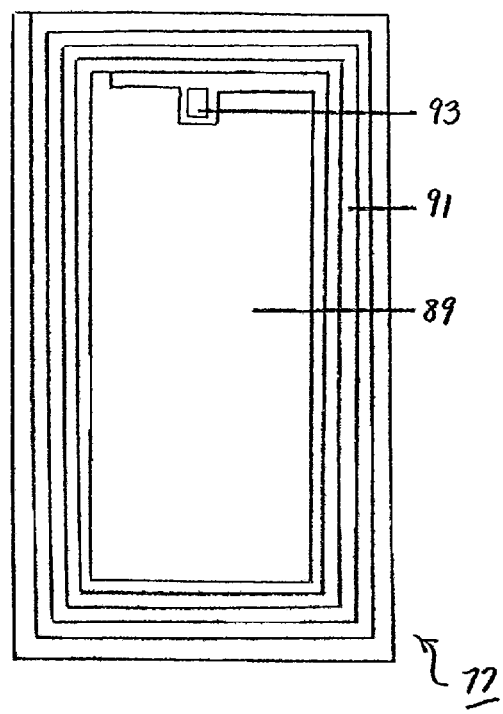
FIG. 4 is a top plan view of the radio frequency inlay shown in FIG. 3.
Figure 3:
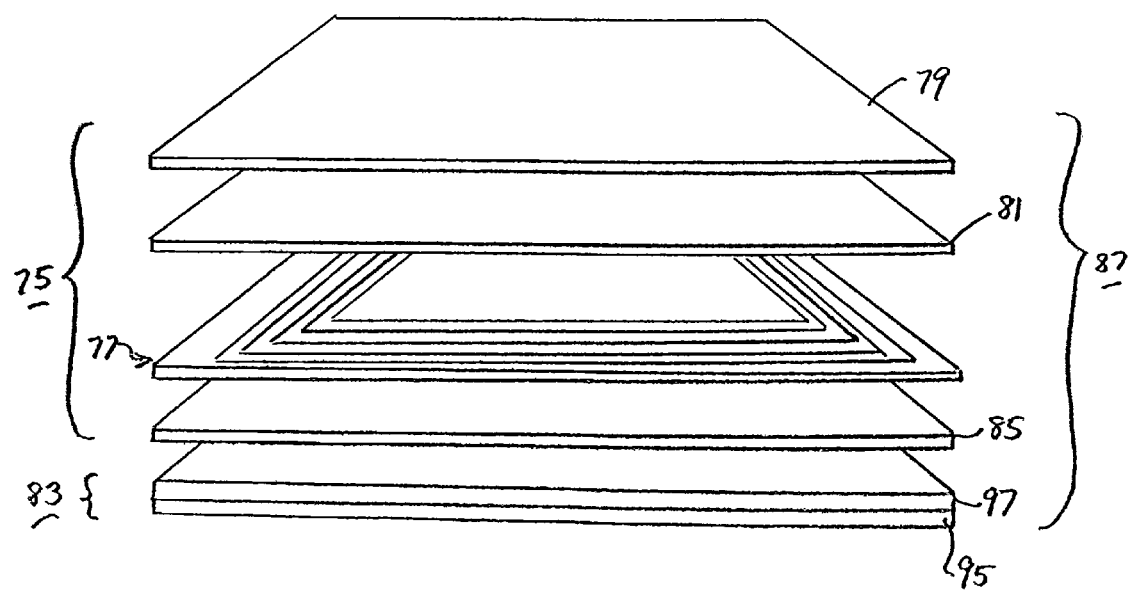
FIG. 3 is an exploded top perspective view of a radio frequency identification tag which can be used in conjunction with the business model shown in FIG. 2 for item-level tracking purposes.
Figure 5:
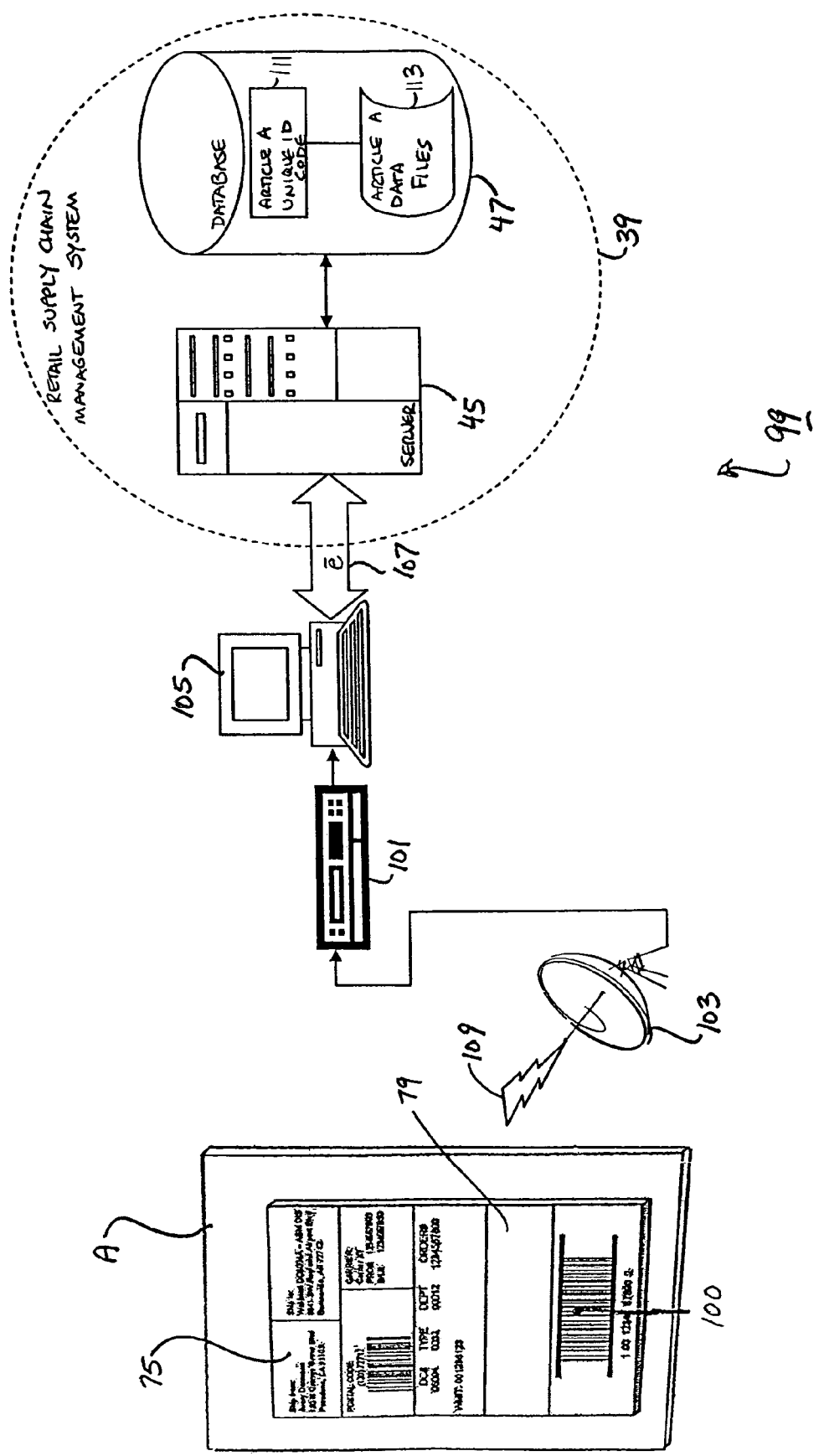
FIG. 5 is a simplified block diagram of an item-level tracking system constructed according to the teachings of the present invention, the tracking system utilizing radio frequency identification technology to automatically transfer data from an RFID label to a retail supply chain management system.

Referring now to FIG. 5, there is shown an article tracking system which is constructed according to the teachings of the present invention and represented generally by reference numeral 99. As will be described further below, article tracking system 99 is designed to wirelessly transmit data from a conventional RFID label (e.g., RFID label 75) to a retail supply chain management system 39.

In tracking system 99, an RFID label 75 is shown affixed to an article of commerce A. As can be appreciated, RFID label 75 is preferably programmed to include a unique identification code (e.g., using the electronic product code system) which can be retrieved using radio frequency technology.

As can be seen in FIG. 5, a bar code 100 is printed on facestock 79 of label 75. However, it should be noted that bar code 100 is not an alternative representation of the unique identification code that is programmed onto IC chip 93. Rather, bar code 100 is provided to supply data of a considerably smaller size, such as the SKU number for article A.

Tracking system 99 includes an RFID reader 101 which is designed to retrieve the unique identification code that is programmed into RFID label 75. Reader 101 is electrically connected to an antenna 103 which is located in the general vicinity (e.g., several meters) of radio frequency identification tag 75. Reader 101 is additionally electrically connected to a computer 105 which is linked to supply chain management system 39 through an internet-based electronic communication path 107. Preferably, each participant of the retail supply chain (e.g., manufacturing facility 19, consolidator 29, distribution center 33 and retailer 13) is provided with computer 105, reader 101 and antenna 103 in order to upload and retrieve data into/from database 47, as will be described in detail below.

Specifically, article tracking system 99 operates in the following manner. RFID reader 101 periodically generates an interrogation signal which is, in turn, transmitted by antenna 103. When subjected to the interrogation signal, integrated circuit chip 93 becomes active and converts its stored identification code into a corresponding electromagnetic signal which is, in turn, propagated as radio frequency waves by antenna 91, said propagated RF signal being represented generally by reference numeral 109. If antenna 103 is located within a defined range of RFID label 75, antenna 103 transmits signal 109 to RFID reader 101 which then converts RF signal 109 into a digital code. Computer 105 electronically transmits the digital code to server 45 of retail supply chain management system 39. Server 45 utilizes the digital code (represented in FIG. 5 by reference numeral 111) as a license plate to locate within database 47 the particular network or computer address where the designated data records for article A are located, the data records being identified generally by reference numeral 113. As can be appreciated, the above-described process enables retail supply chain management system 39 to store the relevant data for each article (e.g., order information, tracking information, etc.) as individual data bundles, which in turn can be retrieved by authorized participants of the retail supply chain for review, which is highly desirable.

Figure 6:
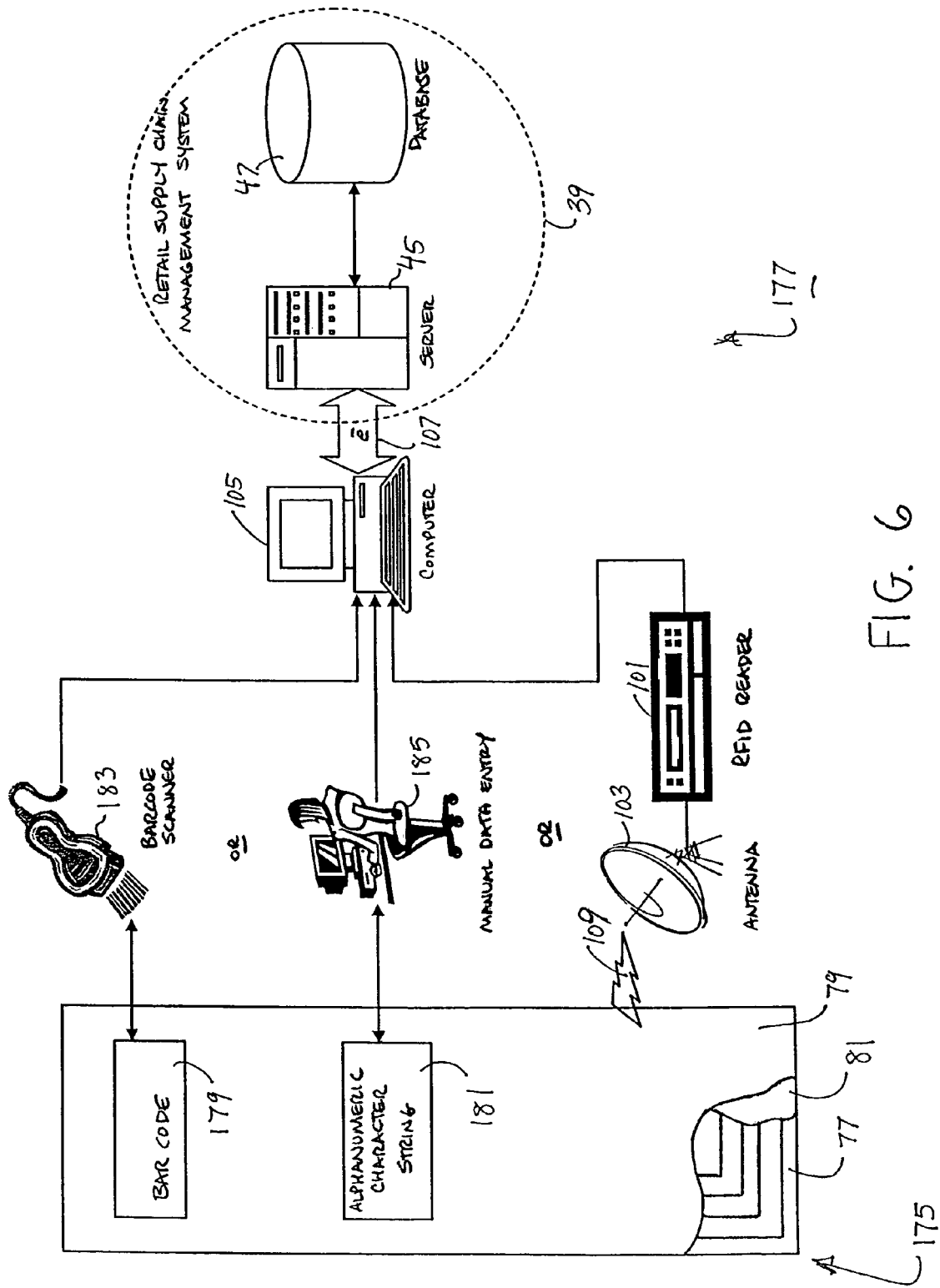
FIG. 6 is a simplified block diagram of a first embodiment of a novel label constructed in accordance with the teachings of the present invention, the label being shown broken away in part and in conjunction with a novel product tracking system that is described in accordance with the teachings of the present invention.

Referring now to FIG. 6, there is shown a first embodiment of a label constructed according to the teachings of the present invention, the label being identified generally by reference numeral 175. Label 175 is shown in conjunction with a novel product tracking system that is described in accordance with the teachings of the present invention, the product tracking system being identified generally by reference numeral 177. As will be described in detail below, label 175 can be used in conjunction with system 177 to track a product, such as an item, carton or pallet, at various stages throughout the retail supply chain.

Label 175 is similar in construction with RFID label 75 in that label 175 includes an RFID inlay 77 that is secured to the underside of a printable face sheet (or facestock) 79 by means of a first layer of pressure sensitive adhesive 81. The principal difference between label 75 and label 175 is that facestock 79 of label 175 is provided with a unique bar code 179 and a unique alphanumeric character string 181, the function of each which will become apparent below.

Label 175 is designed to store data which can be retrieved using multiple independent types of data capture technologies (e.g., RFID and bar code technologies), as will be described further below. Preferably, label 175 is assigned an identification code that uniquely identifies the product (i.e., the item, carton, pallet, etc.) to which label 175 is affixed. The unique identification code can be used, in turn, as a license plate to retrieve pertinent data records relating to the product to which label 175 is affixed, as will be described further below.

The identification code assigned to label 175 is preferably in the form of at least a 96 bit or 128 bit electronic product code (EPC). The fields of the unique identification code may include an identification number for the manufacturer of the product and a SKU identification number. However, it is to be understood that the identification code for label 175 is not limited to any particular coding system. Rather, any conceivable coding could be used as the identification code for label 175 so long as the coding uniquely identifies the product.

As a principal feature of the present invention, label 175 is provided with three distinct means for storing its unique identification code. It is for this reason that label 175 is referred to herein as a hybrid label. The three different means in which label 175 stores its identification code are listed below.

The first means in which label 175 stores its unique identification code is through RFID technology. Specifically, the identification code (i.e., the electronic product code) is digitally programmed into IC chip 93 of RFID inlay 77.

The second means in which label 175 stores its unique identification code is through bar code 179. Specifically, bar code 179 is configured to represent the unique identification code (i.e., the electronic product code). Bar code 179 may be provided in either a 1-dimensional or 2-dimensional format depending on the size of the identification code assigned to label 175.

The third means in which label 175 stores its unique identification code is through alphanumeric character string 181. Specifically, character string 181 is written in such a manner so as to represent the unique identification code.

Preferably, label 175 is generated using an integrated software system which manages the RFID chip programming process, the barcode printing process as well as the alphanumeric character string printing process. All of the aforementioned processes may be performed using either a single integrated/combination printer or a network of separate printing components.

Label 175 is designed principally for use in conjunction with product tracking system 177. Specifically, computer 105 is configured to receive a digital version of the identification code assigned to label 175. Computer 105 then electronically transmits the digital code to server 45 of retail supply chain management system 39. Server 45 utilizes the digital code as a license plate to locate within database 47 the particular network or computer address where the designated data records are located for the product to which label 175 is affixed.

For the purposes of the present invention, computer 105 represents any device that is designed to perform calculations. Furthermore, it is to be understood that computer 105 could be integrated into other components of product tracking system 177 without departing from the spirit of the present invention.

As noted briefly above, tracking system 177 provides multiple independent means for capturing the identification code associated with label 175 onto computer 105.

As a first means, the identification code is captured by computer 105 using RFID technology. Specifically, RFID reader 101 periodically generates an interrogation signal which is, in turn, transmitted by antenna 103. When subjected to the interrogation signal, integrated circuit chip 93 becomes active and converts its stored identification code into a corresponding electromagnetic signal which is, in turn, propagated as radio frequency waves by antenna 91, said propagated RF signal being represented generally by reference numeral 109. If antenna 103 is located within a defined range of RFID label 75, antenna 103 transmits signal 109 to RFID reader 101 which then converts RF signal 109 into the digital code. Having converted the RF signal 109 into a digital representation of the code, RFID 101 then transmits the digital code to computer 105.

As a second means, the identification code is captured by computer 105 using bar code technology. Specifically, a bar code scanner 183 is utilized to scan the pattern of parallel lines in bar code 179. Bar code scanner 183 translates the detected pattern of parallel lines into a digital code which is, in turn, transmitted to computer 105.

As a third means, the identification code is captured by computer 105 through manual data entry. Specifically, data entry personnel 185 manually types alphanumeric character string 181 onto computer 185 which, in turn, translates string 185 into the digital code.

Figure 7:
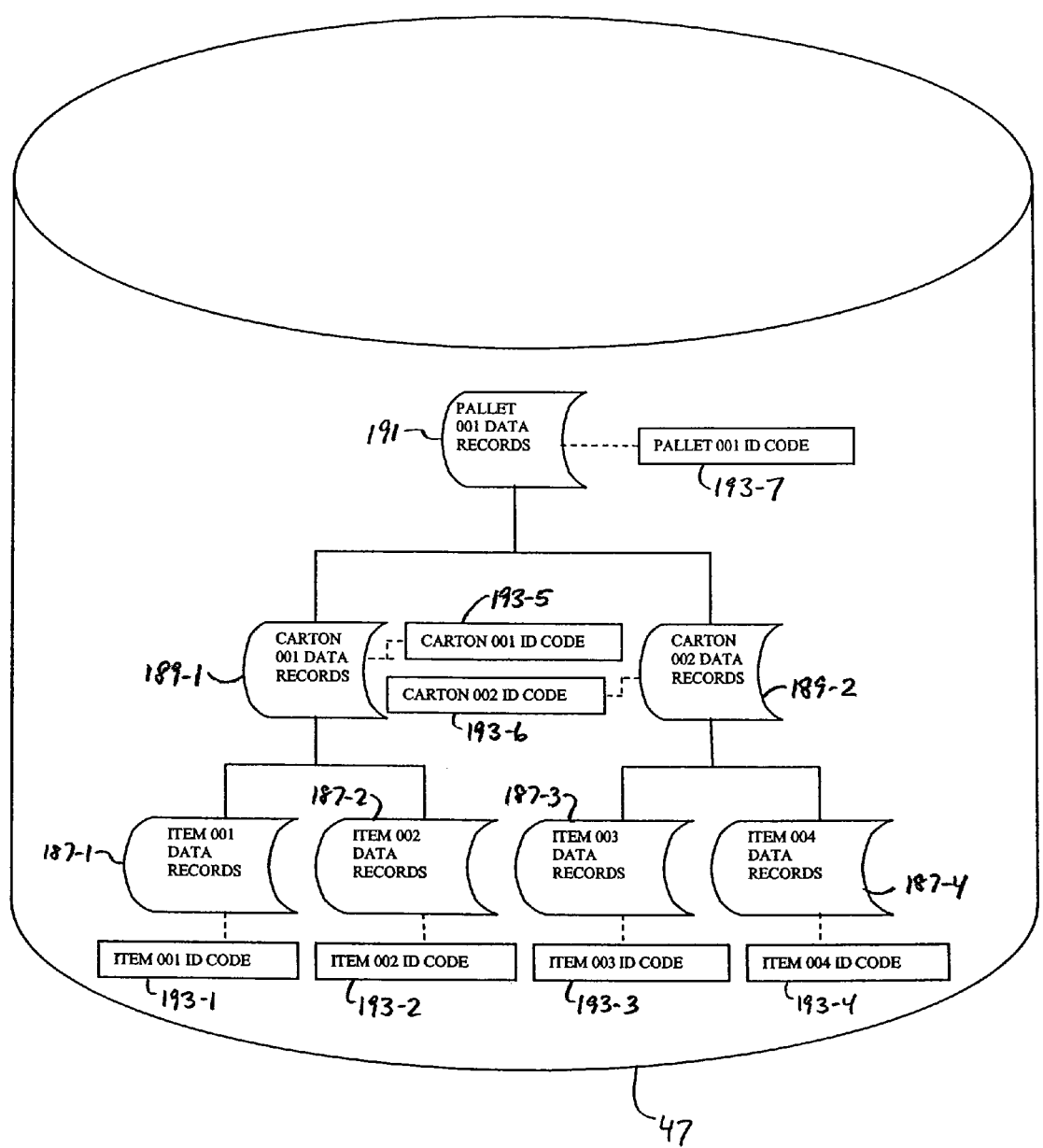
FIG. 7 is a simplified block diagram of the database shown in FIG. 6, the database being shown with one possible means for structuring the architecture of data records stored therein.

Referring now to FIG. 7, the ability to assign an identification code (e.g., the Electronic Product Code) to individual items (as well as cartons, pallets, etc.) allows for the various data records in database 47 to be "associated", or configured, in conjunction with the packing hierarchy. This association of data records is preferably created during the scanning/packing process undertaken at manufacturing facility 19.

Specifically, item-level data records 187-1 through 187-4 are linked with carton-level data records 189-1 and 189-2 in the particular manner in which each item is packed within its corresponding carton. For example, as represented in FIG. 7, items 001 and 002 are packed within cartoon 001 and items 003 and 004 are packed within carton 002. As a result, the corresponding data records are associated in a similar manner. Namely, item-level data records 187-1 and 187-2 are associated with carton-level data records 189-1 and item-level data records 187-3 and 187-4 are associated with carton-level data records 189-2. Furthermore, as represented in FIG. 7, cartons 001 and 002 are packed within pallet 001. As a result, carton-level data records 189-1 and 189-2 are associated with pallet-level data records 191.

In accordance with the present invention, each data record is additionally associated with its corresponding identification code 193-1 through 193-7, the identification code being used as a license plate for tracking the location of its corresponding data record within database 47.

It should be noted that FIG. 7 represents one way in which data records may be interrelated within database 47. However, it is to be understood that the particular architecture of data records within database 47 could be significantly modified (in accordance with different types of packing hierarchies) without departing from the spirit of the present invention.

It should also be noted that the architecture of the various data records is represented in FIG. 7 as being interrelated in a tree-like configuration only for the purpose of simplicity in understanding the relationship between certain data records. In actuality, the various classes of data records (e.g., carton, pallet and item data records) would be stored separately in their own independent tables. A separate table (i.e., a relationship table) would retain the relationship information corresponding to the various data records and would serve to link (i.e., associate) data records that are related based on the particular packing hierarchy.

It should further be noted that the above-described association of related data records can be used to create multiple levels of advanced shipping notifications (e.g., item-level and carton-level ASNs) which can be stored within database 47 and/or transmitted to supply chain partners such as the supplier, retailer and distributer. As can be appreciated, the creation of multiple levels of advanced shipping notifications allows for greater control and visibility of product throughout the supply chain, which is highly desirable.

It is to be understood that numerous modifications to hybrid label 175 and system 177 could be made without departing from the spirit of the present invention.

As a first example, hybrid label 175 is not limited to use in conjunction with system 177 (i.e., for product tracking purposes). Rather, label 175 may be used simply to store data that can be retrieved using multiple independent types of data retrieval technologies. Specifically, label 175 may be used to store SKU information (i.e., data not unique at the item level) for a product that can be retrieved using either RFID technology, bar code technology and/or manual data entry without departing from the spirit of the present invention.

Figure 8:
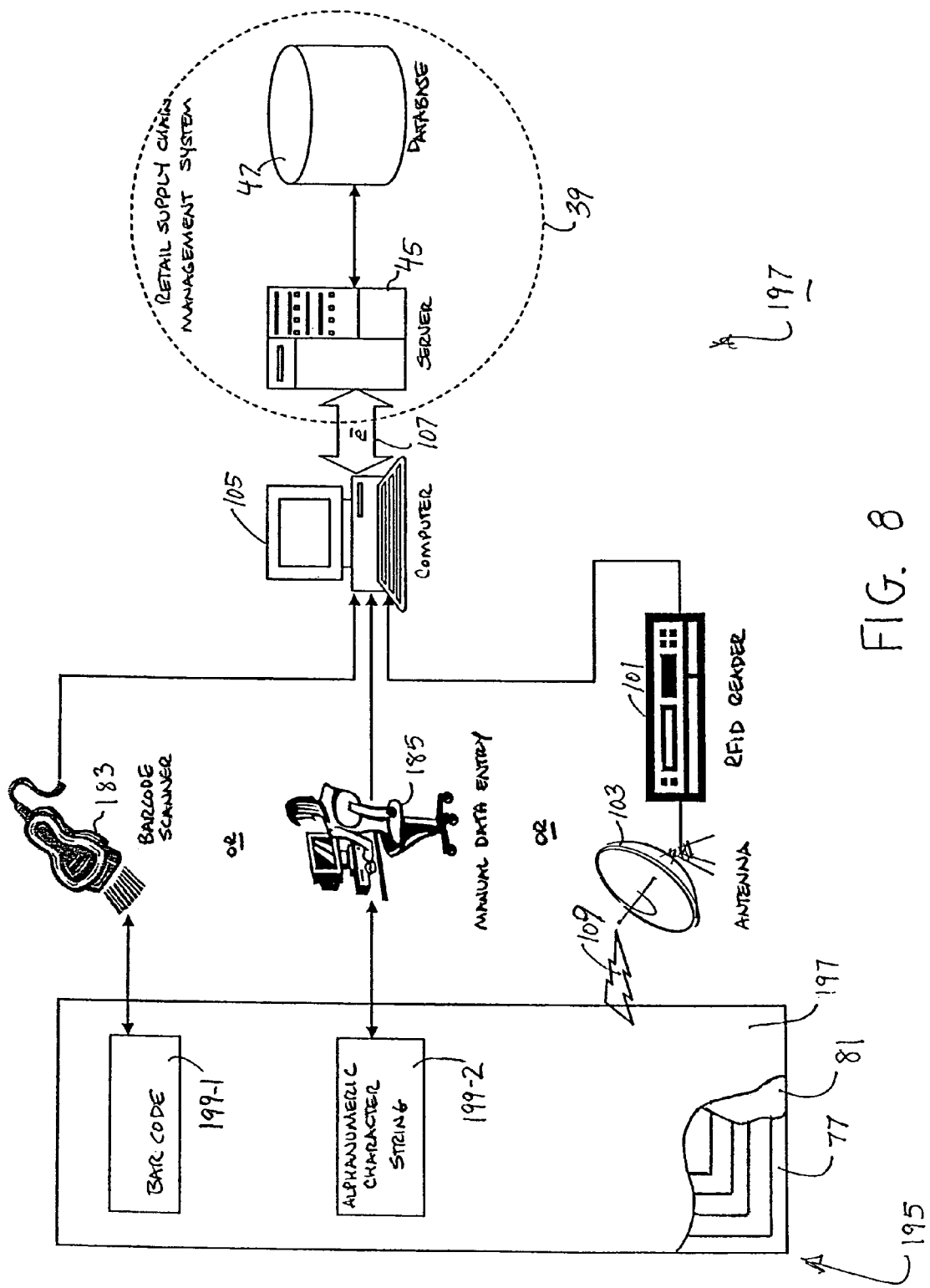
FIG. 8 is a simplified block diagram of a second embodiment of a novel label constructed in accordance with the teachings of the present invention, the label being shown in conjunction with a novel product tracking system that is described in accordance with the teachings of the present invention.

As a second example, in certain circumstances, it may be either impractical or impossible to represent the entire identification code (i.e., the Electronic Product Code) as either a barcode and/or alphanumeric character string. Accordingly, referring now to FIG. 8, there is shown a second embodiment of a hybrid label constructed according to the teachings of the present invention, said label being identified generally by reference numeral 195. Label 195 is shown in conjunction with a second embodiment of a novel product tracking system that is described in accordance with the teachings of the present invention, the product tracking system being identified generally by reference numeral 197. Label 195 can be used in conjunction with system 197 to track a product, such as an item, carton or pallet, at various stages throughout the retail supply chain.

Label 195 is similar to label 175 in that label 195 includes an RFID inlay 77 that is secured to the underside of a printable face sheet (or facestock) 197 by means of a first layer of pressure sensitive adhesive 81. Similar to label 175, RFID inlay 77 of label 195 is also preferably programmed with an identification code, the identification code preferably being in the form of the Electronic Product Code. The principal difference between label 195 and label 175 is that facestock 197 of label 195 is provided with a first link code 199-1 and a second link code 199-2.

Figure 9:
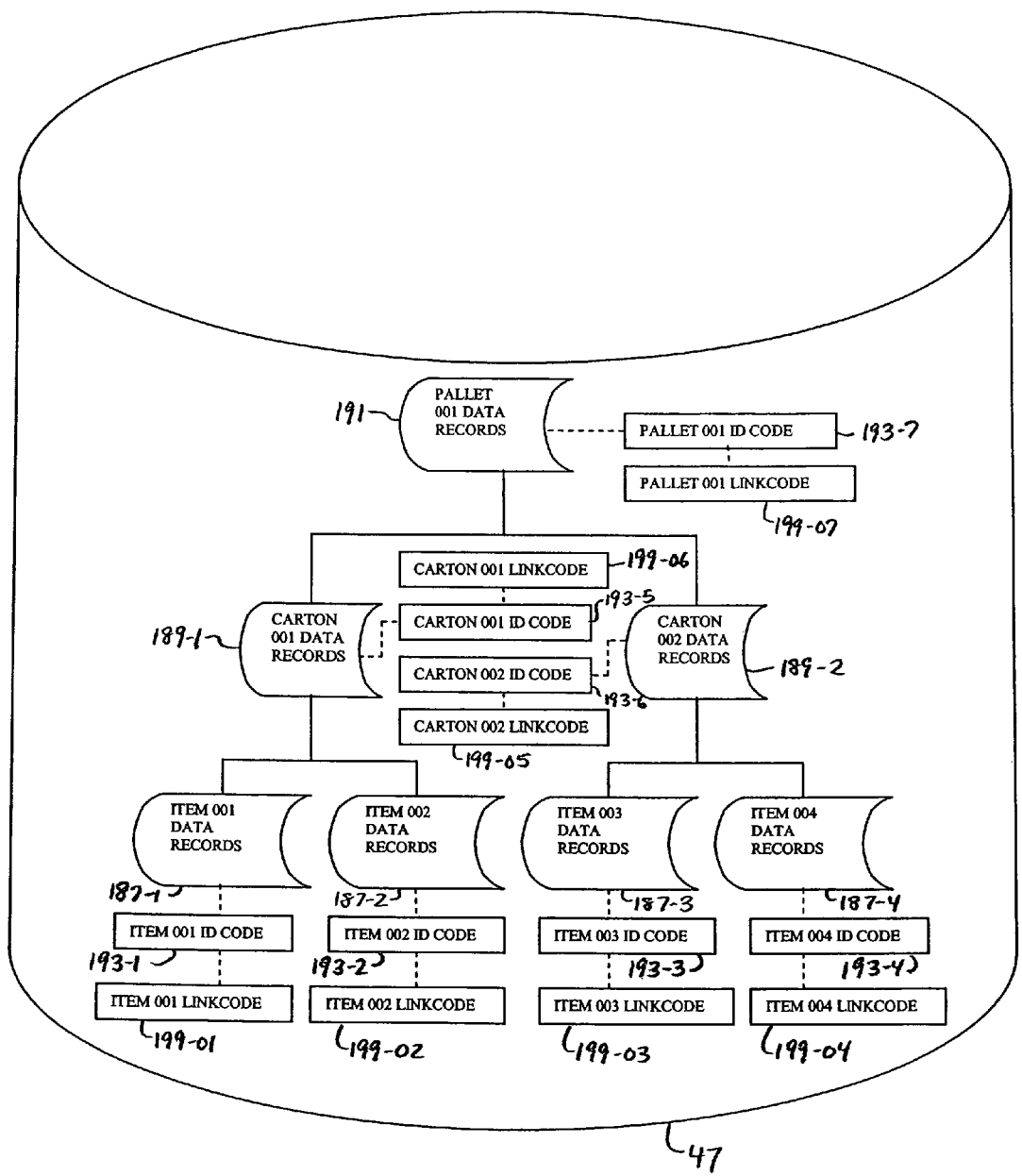
FIG. 9 is a simplified block diagram of the database shown in FIG. 8, the database being shown with one possible means for structuring the architecture of data records stored therein.

Each link code 199 represents a unique code of reduced size that is associated in the system database 47 with the larger sized identification code programmed on the IC chip of RFID inlay 77, as seen most clearly in FIG. 9. Otherwise, it is to be understood that the remaining interrelationship of records within database 47 is identical in nature with the data record architecture example shown in FIG. 7.

In operation, each of link codes 199-01 through 199-07 can be used by tracking system 197 to retrieve the corresponding identification code 193 for its label 195 without the use of RFID data capture means (i.e., reader 101 and antenna 103). In turn, the corresponding identification code 193 can then be used to retrieve from database 47 the bundle of data records associated with the product to which label 195 is affixed (i.e., in the same manner as in tracking system 177).

Referring back to FIG. 8, link code 199-1 is preferably represented as a bar code which can be captured by computer 105 using a bar code scanner 183. In addition, link code 199-2 is preferably represented as an alphanumeric character string which can be manually input into computer 105 by data entry personnel 185.

It should be noted that the particular link code 199 utilized for label 195 preferably includes a limited amount of data, thereby enabling it to be represented as a shortened one-dimensional (or two-dimensional) barcode and/or a shortened string of alphanumeric characters. In fact, it should be noted that a computer-based, unique ID generator may be used to automatically generate the particular link codes for label 195 without departing from the spirit of the present invention.

Both embodiments of hybrid labels (and their associated tracking systems) allow for the unique identification code (or other types of data) which is programmed into an RFID chip to be retrieved using means other than RFID technology, which is the principal object of the present invention. Numerous practical benefits are created through the use of such a label.

As a first benefit, a hybrid label reduces the capital investment that is required of participants in the retail supply chain. Specifically, participants in the supply chain are no longer required to invest in relatively costly RFID equipment. Rather, it is to be understood that participants who lack the requisite RFID equipment may alternatively extract the identification code associated with the label through less expensive means (e.g., a bar code scanner or manual data entry).

As a second benefit, a hybrid label minimizes the detrimental effects associated with damage imparted onto an RFID chip. Specifically, conventional RFID labels are rendered essentially useless in those circumstances in which the RFID chip is damaged (either intentionally or unintentionally). To the contrary, a hybrid label which experiences damage to its RFID chip (either intentionally or unintentionally) includes means for extracting the data imparted on the RFID chip by other than through the use of RFID technology.

As a third benefit, a hybrid label provides a client with a means for detecting whether there has been any intentional tampering with the RFID chip (e.g., by an unscrupulous consumer who desires to improperly divert the product to which the label is affixed). Specifically, by providing means for extracting the unique identification code from the hybrid label other than through the use of RFID technology, the client is able to authenticate the code that is programmed on the RFID chip. In the event that the code programmed on the RFID chip does not correspond to the code extracted from the label through non-RFID means, a high likelihood of RFID chip tampering can be deduced.

As a fourth benefit, a hybrid label enables a client to reproduce (i.e., replace) those labels which have been either tampered with or damaged. Specifically, by retrieving the unique identification code from a hybrid label through the use of means other than RFID technology, an otherwise compromised label can be replaced with an exact replica of the label as it was originally constructed.

As noted above, the ability to uniquely identify individual items in the supply chain provides a number of significantly advantageous applications in the retail industry. A sampling of the numerous potential advantages which can be realized based on the ability to readily associate a unique identification code assigned to a label with any/all of the unique order information relating to the product to which said label is affixed are listed below:

(1) Anti-Counterfeit Applications: The authenticity of an article can be determined by using its assigned identification code to extract its corresponding data records from database 47. In the event that a tagged article has an invalid identification code (i.e., a code not supported in database 47), one may deduce that the article is counterfeit.

It should be noted that to more easily detect counterfeit articles, each unique identification code may be encrypted with a private digital key which is used to generate a digital signature. Accordingly, in use, the client may pick up a suspected counterfeit item, extract its unique identification code and send the data to anti-counterfeit software applications hosted in database 47. The software then checks to see if the digital signature for the identification code is valid through a decoding and matching process. Even if the identification code happens to be valid, multiple queries registered in database 47 for the same identification code will denote the possibility that the same unique label is being reproduced and affixed onto counterfeit items.

(2) Anti-Diversion Applications: Utilizing the unique identification code which is assigned to a tagged article (or similarly a tagged carton, pallet, etc.), a client can retrieve from database 47 country/location information associated with that article. In this manner, if the particular location of the article at the time of examination does not match the country/location information associated with that article in the processed ticket order report, the client can deduce that the article, at some point during the supply chain, was improperly diverted to the wrong location. If the article is tracked throughout the supply chain, the client may be able to accurately pinpoint which participant in the supply chain was responsible for the improper diversion of the product.

As an example, if an article designed for the Chinese market is found in the United States, a brand owner may retrieve the identification code from the label of the diverted article. In turn, the brand owner may use the retrieved identification code to query database 47. Database 47 may then show that the diverted article was shipped by the brand owner's distribution center to an independent distributor (i.e., an outside shipping agency). This information would suggest to the brand owner that the independent distributor was the most likely culprit of improperly diverting the article and future preventive measures can be undertaken.

(3) Article Return Applications: By assigning a unique identification code to every article that a manufacturer produces, a consumer who desires to return a particular article would only need to present the identification tag to the retailer to process the return. The retailer, utilizing the unique identification code associated with the tagged article, would then be able to retrieve any relevant information relating to the purchase of said article. For example, the retailer can use the identification code to determine, among other things, where and/or when the article was purchased as well as the cost of the article at the time of purchase. This could further serve as a means for combating return fraud (i.e., the process by which an unscrupulous consumer returns a stolen item back to the retailer).

(4) Article Quality Applications: By assigning a unique identification code to every article that a manufacturer produces, a client is able to retrieve the vendor manufacturing information associated with that article. In this manner, the client is able to ascertain the point of origin (i.e., the particular manufacturing facility or even a particular department within said manufacturing facility) of defective or otherwise inferior articles.

(5) Article Tracking Applications: By assigning a unique identification code to every article that a manufacturer produces, a client is provided with real-time visibility of said articles at all stages of the supply chain. In this manner, a client is able to monitor the completeness and/or timeliness of a shipment.

As described in detail above, hosted database 47 serves as a central repository for tracking data for products at the item-level, carton-level and/or pallet-level. Specifically, supply chain partners (e.g., consolidators, distribution centers, retailers, etc.) can send tracking data updates to hosted database 47. The tracking data updates can be at the item level (e.g., the distributor received item 001 on Jan. 1, 2005), the carton level (e.g., distributor received cartoon 001 on Jan. 1, 2005) or the pallet level (e.g., distributor received pallet 001 on Jan. 1, 2005). A number of more specific tracking applications result and are listed below.

As a first application, the particular architecture of data records in database 47 allows for the client to readily associate various levels of tracking information. Specifically, since data records are associated with one another in database 47 in compliance with the packing hierarchy, a software system can deduce (1) that the receipt of a pallet similarly denotes the receipt of any cartons and items that are contained therein and (2) the receipt of a carton denotes the receipt of any items contained therein.

As a second application, if a supply chain partner (e.g., distribution center) re-packs a carton and/or pallet, the software system is equipped to send a status update to hosted database 47 which lists the new packing hierarchy.

As a third application, a comparison and alert mechanism can be established to compare supply chain partner status updates against targets set by the client. For example, with respect to a particular purchase order, a supplier might set a target date for a product to be delivered (e.g., for carton 001 to arrive at distribution center 33 no later than Feb. 3, 2005). If the target date is missed, supply chain management system 39 issues an alert of non-compliance (e.g., such as by sending a notification to the supplier/buyer of the missed target date).

(6) Auditing/Inventory Control Applications: The utilization of an automatic identification system for individual articles of commerce enables a client to perform fast, accurate and frequent auditing of its inventory. In particular, it should be noted that the use of automatic data retrieval (e.g., RFID technology) minimizes the labor costs associated with more traditional auditing services and, in addition, allows for the recuperation of lost margin dollars which result from inaccurate manual data exchange. Furthermore, the routine auditing of inventory can be used to render storage facilities more efficient. As an example, a retailer who routinely stores an excessive amount of excess product can reduce the size of future shipments of said product (thereby reducing storage costs). As another example, a retailer who routinely stores an inadequate amount of product can increase the size or frequency of shipments to more adequately meet customer demands.

(7) Security Applications: The association of an automatic identification code for each individual article of commerce enables a client to more accurately track the location of its articles. As a result, the risk of theft/shrinkage at all points during the supply chain can be minimized. For example, freight loss (i.e., the loss of product within a shipment) can be quickly detected and accurately traced to a particular participant in the product supply chain. As another example, customer and employee theft can be reduced at the store level of the supply chain.

As can be appreciated, the potential uses of the present invention are numerous. It should be noted that other potential applications of the present invention that are not expressly stated herein could be realized without departing from the spirit of the present invention.

The embodiments shown in the present invention are intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A system for tracking at least one product, such as an item, carton or pallet, within a retail supply chain, the system comprising,
   (a) a supply chain management system which includes at least one database, the at least one database having a first set of electronic data records stored therein, the first set of electronic data records being designated for a first product,
   (b) a label affixed to the first product, the label comprising,
      (i) a radio frequency identification (RFID) device that stores a unique product identification code,
      (ii) a printed barcode configured to represent a link code, the link code having a length that is shorter than the length of the unique product identification code, and
      (iii) an alphanumeric character string configured to represent the link code,
   (c) a computer configured to capture the unique product identification code and the link code from the label, the computer being connected to the supply chain management system through a communication path,
   (d) automated means for capturing the unique product identification code on the computer from the RFID device,
   (e) automated means for capturing the link code on the computer from the barcode provided on the label, and
   (f) means for capturing the link code on the computer from the alphanumeric character string provided on the label,
   (g) wherein the supply chain management system utilizes the unique product identification code to identify the first set of electronic data records stored in the database,
   (h) wherein the supply chain management system utilizes the link code to locate the unique product identification code which is in turn utilized to identify the first set of electronic data records stored in the at least one database.

2. The system as claimed in claim 1 wherein the automated means for capturing the unique product identification code on the computer from the RFID device is through the use of an RFID reader.

3. The system as claimed in claim 2 wherein the label includes an RFID inlay which stores the unique product identification code.

4. The system as claimed in claim 1 wherein the automated means for capturing the link code on the computer from the barcode is through the use of a barcode scanner.

5. The system as claimed in claim 1 wherein the means for capturing the link code on the computer from the alphanumeric character string is through manual data entry.

6. The system as claimed in claim 1 wherein the at least one database includes additional sets of electronic data reports, each set of electronic data reports being designated for a particular product.

7. The system as claimed in claim 6 wherein the sets of electronic data reports are associated with one another in the database based on the packing hierarchy of the products to which the sets of electronic data reports are designated.

* * * * *